(12) United States Patent
Frame

(10) Patent No.: US 9,429,180 B2
(45) Date of Patent: Aug. 30, 2016

(54) LOCKING STEM/FASTENER AND CASTER HAVING SAME

(71) Applicant: JACOB HOLTZ COMPANY, Lester, PA (US)

(72) Inventor: William F. Frame, Hockessin, DE (US)

(73) Assignee: JACOB HOLTZ CO., Lester, PA (US)

( * ) Notice: Subject to any disclaimer, the term of this patent is extended or adjusted under 35 U.S.C. 154(b) by 0 days.

(21) Appl. No.: 14/080,006

(22) Filed: Nov. 14, 2013

(65) Prior Publication Data

US 2014/0137368 A1 May 22, 2014

Related U.S. Application Data

(60) Provisional application No. 61/726,328, filed on Nov. 14, 2012.

(51) Int. Cl.
*F16B 39/02* (2006.01)
*B60B 33/00* (2006.01)
*F16B 39/04* (2006.01)

(52) U.S. Cl.
CPC ........... *F16B 39/02* (2013.01); *B60B 33/0007* (2013.01); *B60B 33/0021* (2013.01); *F16B 39/04* (2013.01); *Y10T 16/182* (2015.01); *Y10T 16/201* (2015.01)

(58) Field of Classification Search
CPC ... Y10T 16/18; Y10T 16/182; Y10T 16/199; Y10T 16/201; Y10T 16/202; B60B 33/00; B60B 33/04; B60B 33/0002; B60B 33/0007; B60B 33/0021; F16B 39/02; F16B 39/04; F16B 39/06; F16B 39/32

USPC ....... 16/18 R, 19, 37–39; 411/321, 216–219, 411/205–211

See application file for complete search history.

(56) References Cited

U.S. PATENT DOCUMENTS

| | | | | |
|---|---|---|---|---|
| 513,540 | A | * | 1/1894 | Slusser .......................... 411/321 |
| 527,390 | A | * | 10/1894 | Johnston ....................... 411/321 |
| 660,594 | A | * | 10/1900 | Shammo ........................ 411/321 |
| 679,935 | A | * | 8/1901 | Behler .......................... 411/321 |
| 816,779 | A | * | 4/1906 | Cheek ........................... 411/321 |
| 843,147 | A | * | 2/1907 | Hyle .............................. 411/321 |
| 849,720 | A | * | 4/1907 | Blessing et al. .............. 411/321 |
| 1,067,163 | A | * | 7/1913 | Broomfield ................... 411/207 |
| 1,197,701 | A | * | 9/1916 | Wilks ............................ 411/321 |
| 1,218,072 | A | * | 3/1917 | Foster .......................... 411/216 |
| 1,261,646 | A | * | 4/1918 | Taber ............................ 411/321 |
| 1,491,097 | A | * | 4/1924 | Hoffman ........................ 280/43 |
| 1,525,871 | A | * | 2/1925 | Levandofsky ................ 411/205 |
| 1,551,124 | A | * | 8/1925 | Sorrell .......................... 411/321 |
| 1,772,314 | A | * | 8/1930 | Hormes ......................... 16/100 |
| 1,919,666 | A | * | 7/1933 | Patterson ......................... 16/38 |
| 1,929,743 | A | * | 10/1933 | Jarvis et al. ..................... 16/43 |
| 2,051,251 | A | * | 8/1936 | Epstein ............................ 16/38 |
| 2,155,827 | A | * | 4/1939 | Herold ............................. 16/38 |
| 2,564,550 | A | * | 8/1951 | Tichenor ...................... 411/321 |
| 2,730,154 | A | * | 1/1956 | Aspey ........................... 411/321 |

(Continued)

*Primary Examiner* — William Miller
(74) *Attorney, Agent, or Firm* — Kenneth DeRosa; Law Offices of Robert F. Zielinski LLC

(57) ABSTRACT

A locking stem includes a bolt fastener having a pivoting tab that is disposed within a radial slot formed in one end of a shaft of the fastener, the pivoting tab pivots about a pivot, the tab has a pivot point located off center so the tab falls to one side when tilted. The bolt fastener attaches to a complementary fastener attached to a fixture. The locking stem may be for a caster.

13 Claims, 9 Drawing Sheets

(56) References Cited

U.S. PATENT DOCUMENTS 3,164,190 A * 1/1965 De Cruylles
                    Peratallada ............... 411/321

5,404,736 A * 4/1995 Lugo ............................... 70/168
5,745,951 A * 5/1998 Waner ........................... 16/31 R
6,789,990 B1 * 9/2004 Harris et al. ................. 411/206

* cited by examiner

LOCKING STEM/FASTENER AND CASTER HAVING SAME

CROSS-REFERENCE TO RELATED APPLICATIONS

This application claims priority to U.S. Provisional Pat. Application 61/726,328 filed on Nov. 14, 2012.

STATEMENT REGARDING FEDERALLY SPONSORED RESEARCH OR DEVELOPMENT

The present invention was not developed with the use of any Federal Funds, but was developed independently by the inventor.

BACKGROUND

1. Field

The invention relates to locking stems, particularly locking stems for casters.

2. Background

The problem with existing caster stems is that they typically thread into the bottom of a fixture to which the caster stems are attached and over time the casters tend to unthread, i.e., loosen or back off, and eventually fall off the fixture. The object of the present invention is to prevent or greatly reduce the occurrence of casters falling off store fixtures. Another object of the present invention is to provide a locking stem that prevents or reduces the incidence of unthreading, loosening, and backing-off the fixture to which the locking stem is attached.

The above references are incorporated by reference herein where appropriate for appropriate teachings of additional or alternative details, features and/or technical background.

SUMMARY

The locking stem may include a bore formed in the shaft transverse to slot, a bore is formed in the tab, and a pivot pin passes through the slot bore and the tab bore to form a pivot point such that the tab pivots thereabout. The shaft may be partially or fully threaded and the fixture fastener is also threaded to receive the fastener shaft. The shaft may comprise a snap or press fit connection. One end of the tab may extend outwardly from one side of the shaft slot and an other end of tab extends outwardly from an other side of the shaft slot, such that an end wall of the tab engages a top surface of the fixture fastener and wherein the pivot pin and the top surface of the fixture fastener prevent the tab from rotating thereby the tab serves to prevent the stem from unthreading from the fixture.

A locking stem includes a bolt fastener having a pivoting tab that is disposed within a radial slot formed in one end of a shaft of the fastener, the pivoting tab pivots about a pivot, the tab has a pivot point located off center so the tab falls to one side when tilted. The bolt fastener attaches to a complementary fastener attached to a fixture. The locking stem may be for a caster.

BRIEF DESCRIPTION OF THE DRAWINGS

The embodiments will be described in detail with reference to the following drawings in which like reference numerals refer to like elements wherein.

DETAILED DESCRIPTION

Figure 1:
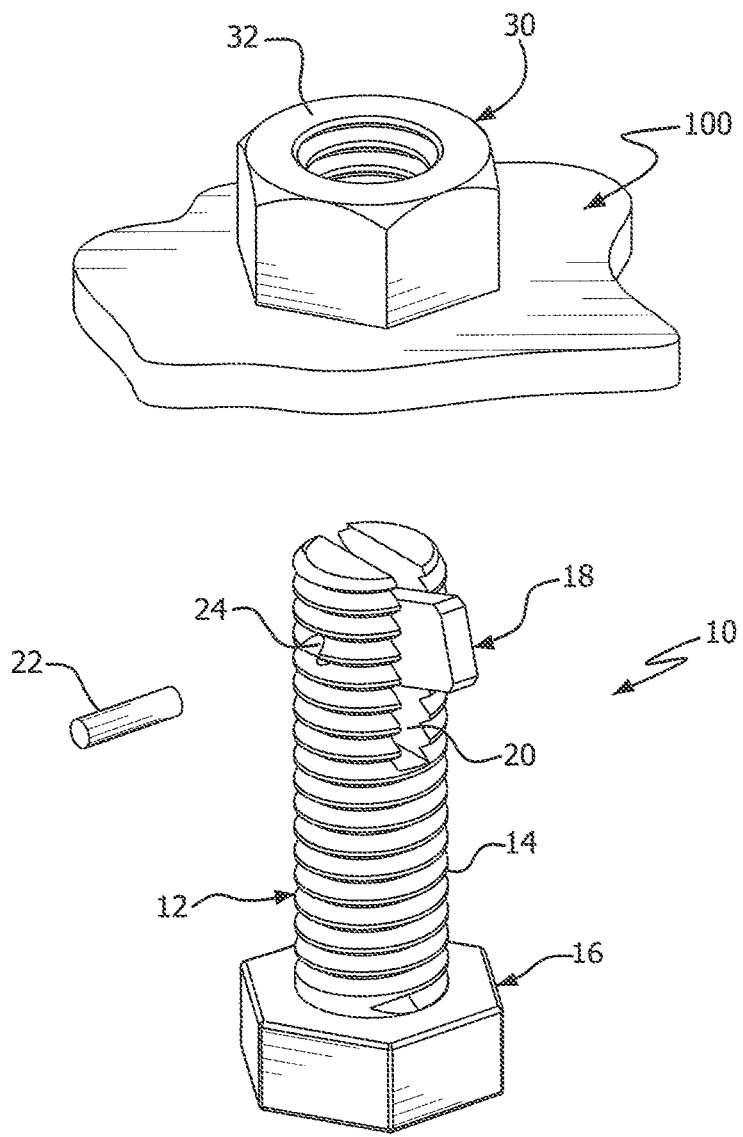
FIG. 1 shows a first embodiment of a locking stem/fastener in accordance with the present invention.
Figure 2:
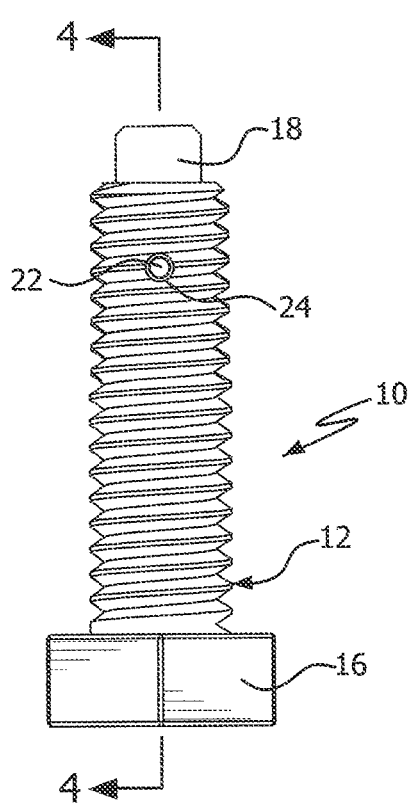
FIG. 2 shows a side view of the locking stem/fastener of FIG. 1.
Figure 3:
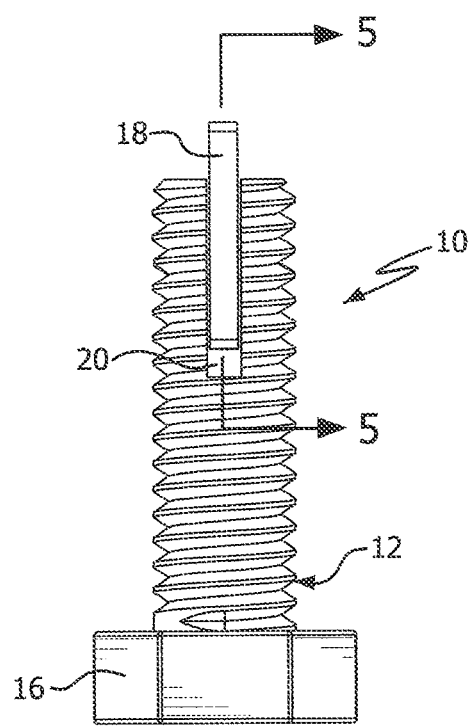
FIG. 3 shows a front view of the locking stem/fastener of FIG. 1.
Figure 4:
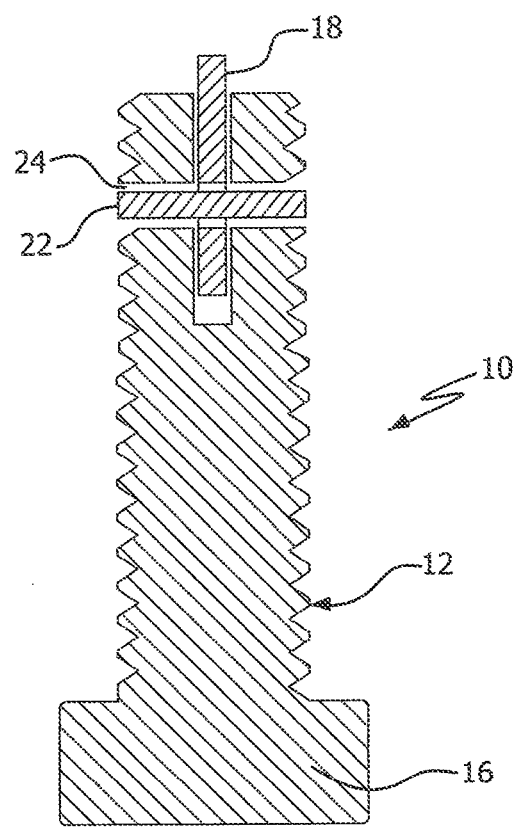
FIG. 4 shows a cross-sectional view of the locking stem/fastener taken along line 4-4 of FIG. 2.

To overcome these and other problems of existing stems, the locking stem of the present invention uses a pivoting locking bolt tab.

Referring now to the FIG. 1-5, the present invention comprises a locking stem or fastener 10 comprising a bolt 12. The bolt 12 may include a fully or partially threaded shank 14 and a head 16, such as the hexagonal bolt head shown. The faster/locking stem 10 comprises a pivoting tab 18 that is disposed within a radial slot 20 formed in the end of the shank 14.

Figure 5:
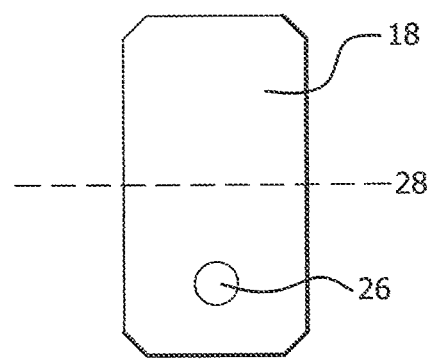
FIG. 5 shows a cross-sectional view of the pivoting tab taken along line 5-5 of FIG. 3.

The pivoting tab 18 pivots about a pivot pin 22 that extends through a bore 24 formed in the shank 12. The bore 24 extends though the shank 12 perpendicular to the slot 20. As best seen in FIG. 5, a corresponding bore 26 is also formed in the pin 18 at one side of a transversely extending centerline 28 of the tab near an end of the pivoting tab 18 to create a pivot point for the tab 18. The pivot point of the tab 18 is located off center so the tab falls to one side naturally when in use, as described in greater detail below.

In this embodiment, the bolt 12 is intended to be threaded into a complementary nut fastener 30 attached to a fixture 100. The fixture may be anything that forms an attachment and in some embodiment of the inventions, the fixture is a chair, bed, any moveable object, or the like. In some preferred applications, the bolt is the stem of a caster, as described in detail below.

Figure 8:
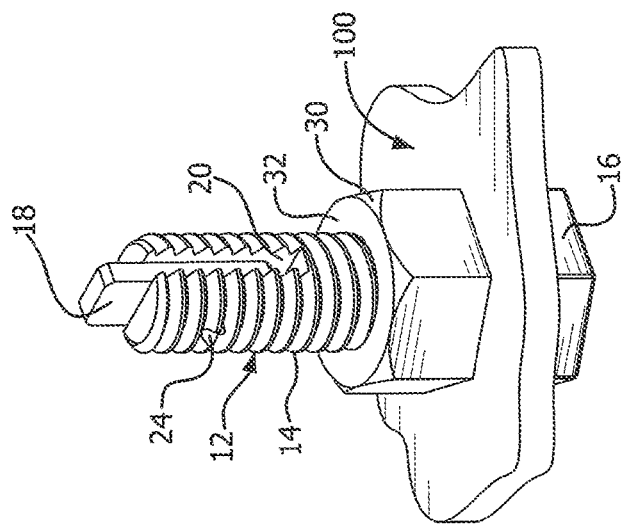
FIGS. 6-8 show the locking stem/fastener of FIG. 1 attached to a fixture with the pivot tab in a non-vertical, pivoted position.
Figure 7:
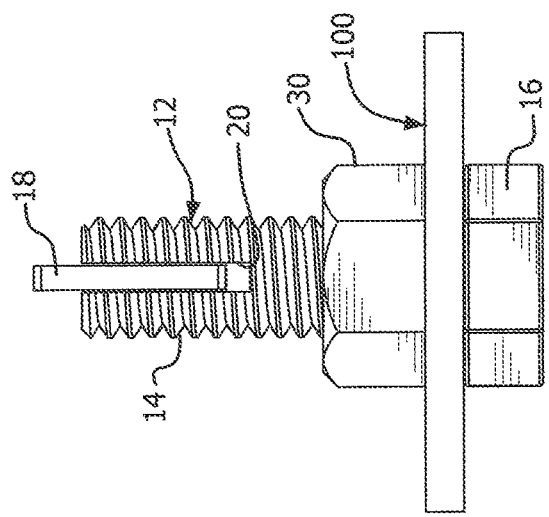
Figure 6:
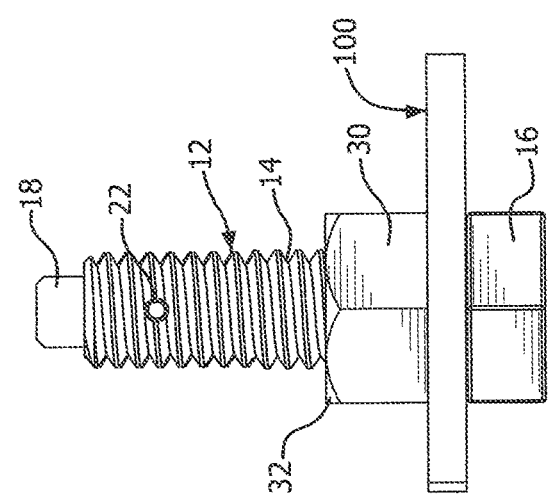

Referring now to FIGS. 6-14, in use, to thread the bolt 12 into the nut 30, the tab 18 is oriented in a vertical position and threaded into the nut 30 of the fixture 100, as best seen in FIGS. 6-8. As shown, the bolt 12 is fully engaged with the nut 30.

Figure 11:
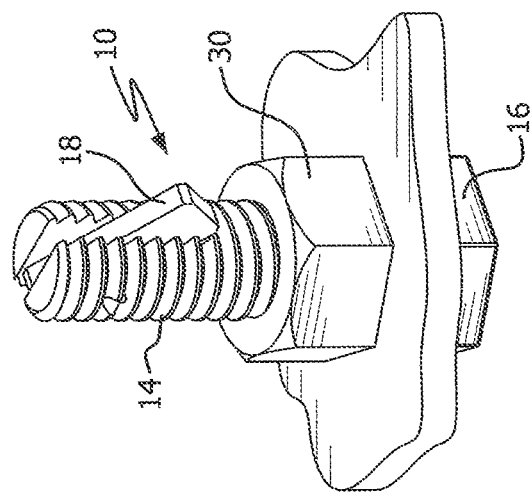
FIGS. 9-11 show the locking stem/fastener of FIG. 1 attached to a fixture with the pivot tab in a vertical upright position.
Figure 10:
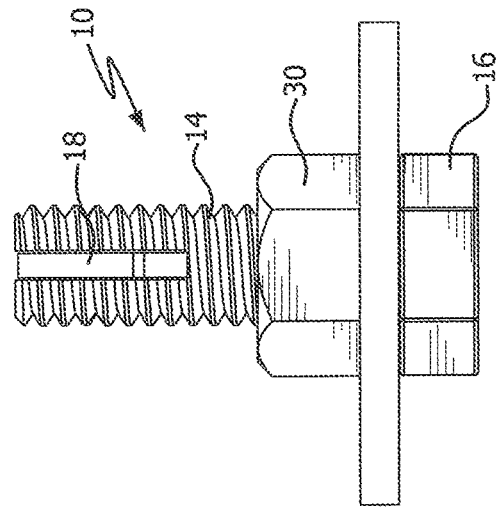
Figure 9:
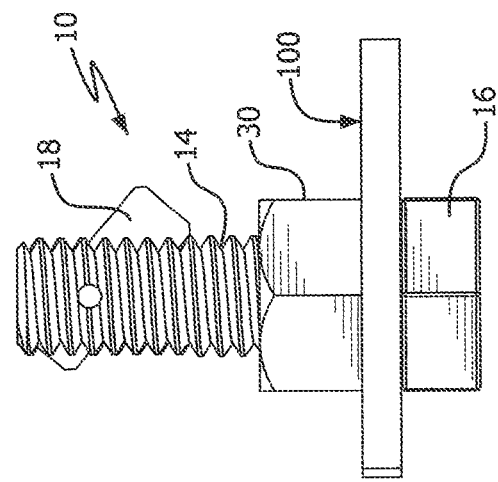

Referring now to FIGS. 9-11, The tab 18 then may pivot about the pivot pin 22 and fall by the force of gravity to one side as shown such as when the fixture is rotated from an upside down to an upright position. Alternatively, the tab may be manually pivoted into the position shown in FIGS. 9-11. The tab stops pivoting when the side of the tab 18 engages the bottom of the slot 20 as shown. In this position, depending upon such factors as the location of bore 26 and bore 24 as well as the depth of the slot 20 and the thickness of the tab 18, the tab 18 is inclined downwardly from the pivoting end of the tab 18 to the opposite free end thereof.

Figure 14:
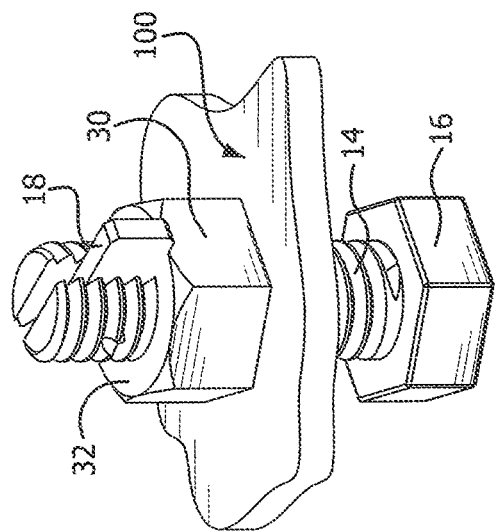
FIGS. 12-14 show the locking stem/fastener of FIG. 1 partially unthreaded from the fixture with the pivot tab engaging the top surface of the nut of the fixture.
Figure 13:
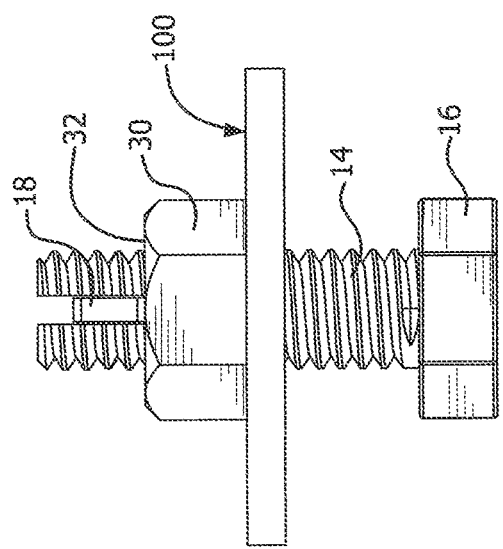
Figure 12:
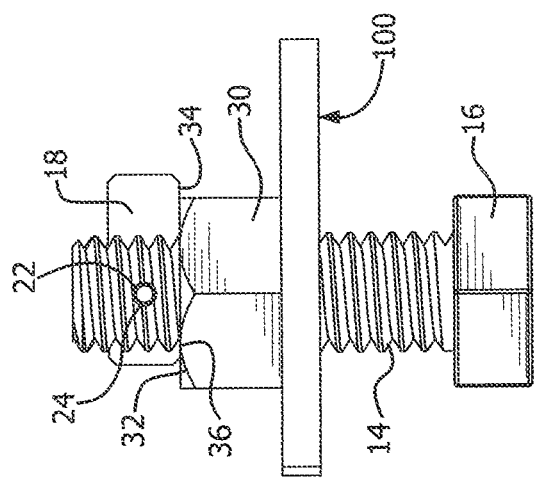

Referring now to FIGS. 12-14, If and when the bolt 12 unthreads from the fixture 100, the tab 18 catches on the top surface 32 of the nut 30 such that both ends 32 and 34 (FIG. 12) engage the top surface 32 of the nut 32, serving to prevent the bolt 12 from unthreading any further. The pivot pin 22 know becomes a locking pin engages the top surface of bores 24 and 26 preventing further upward movement of pin 18 along with the sides 32 and 34 which engage surface 32 of nut 30 which also that prevents downward movement of pin 18 along with preventing the further rotation of tab 18 since side 32 engages with one side of the nut 30 while side 34 engages with the other side of nut 30, To remove the locking stem/fixture 10 from the fixture 100, the stem 10 is threaded completely onto the fixture again (FIGS. 9-11), the fixture 100 is then turned upside down, causing the tab 18 to pivot out of the way (FIGS. 6-8). Then the stem 10 may be unthreaded from the fixture 100. Alternatively, the strength of the tab 18 and pivot pin 22 can be designed such that they are strong enough to keep the stem 10 from unthreading on its own, but weak enough that they can be broken off with the use of a wrench or other tool to unthread the stem 10 from the fixture 100.

The length of the tab 18 and the depth of the slot 20 in the shank 14 are such that the tab 18 can be pivoted up as shown in FIGS. 6-8 but cannot pivot down any further than that shown in FIGS. 9-11. Other combinations of pivot bore 26 location on the tab 18 and dimensions of the tab 18 can be used to accomplish the same result. One such alternate design is shown in FIGS. 15-17.

The location of the pivot bore 24 on the shank 14 is such that it allows the tab 18 to pivot down freely when fully installed yet minimizing the distance the shank 14 can unthread before the tab 18 locks the stem 10 from unthreading any further.

Figure 17:
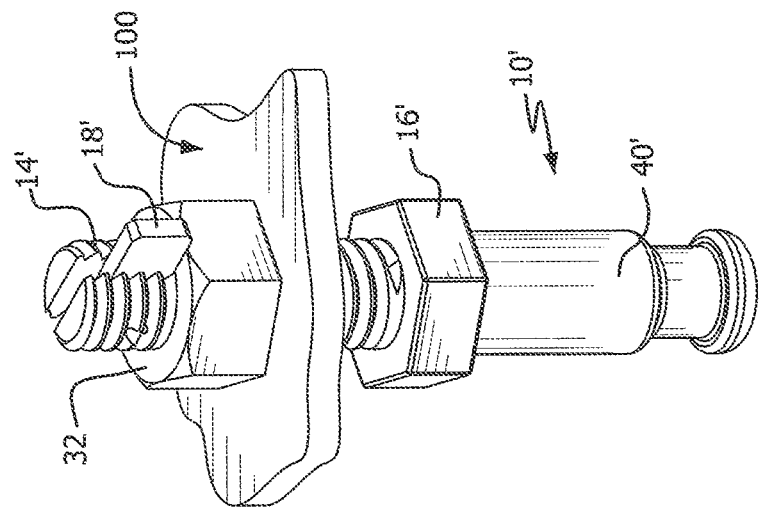
FIGS. 15-17 show a second embodiment of a locking stem/fastener in accordance with the present invention.
Figure 16:
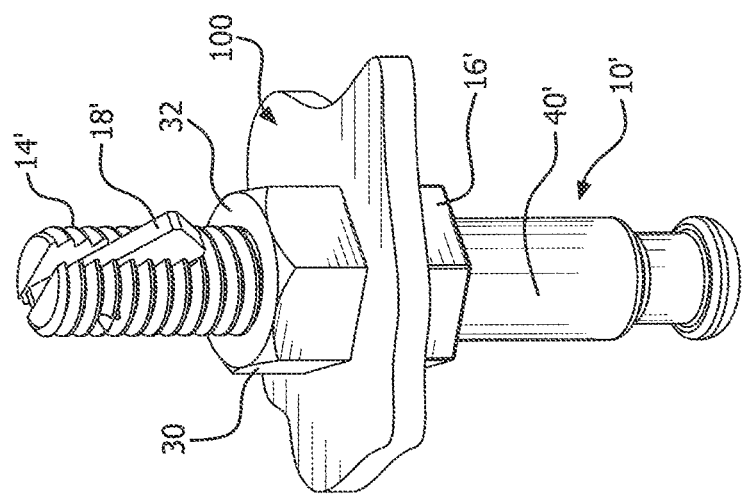
Figure 15:
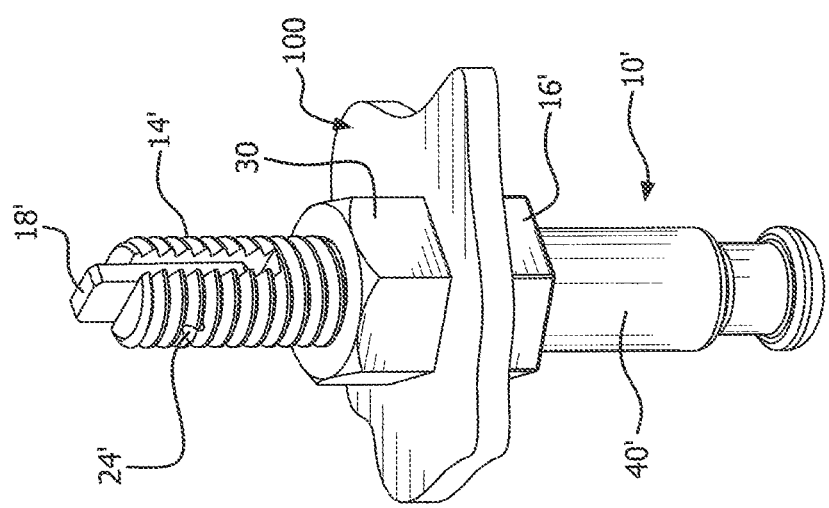

FIGS. 15-17 shows the alternate embodiment present locking stem/fastener invention used with a snap or press fit stem 10' where like reference numerals depict similar elements but have been primed. The snap or press fit connection 40' is formed on the end of the shank 14 and head 16.

Figure 18:
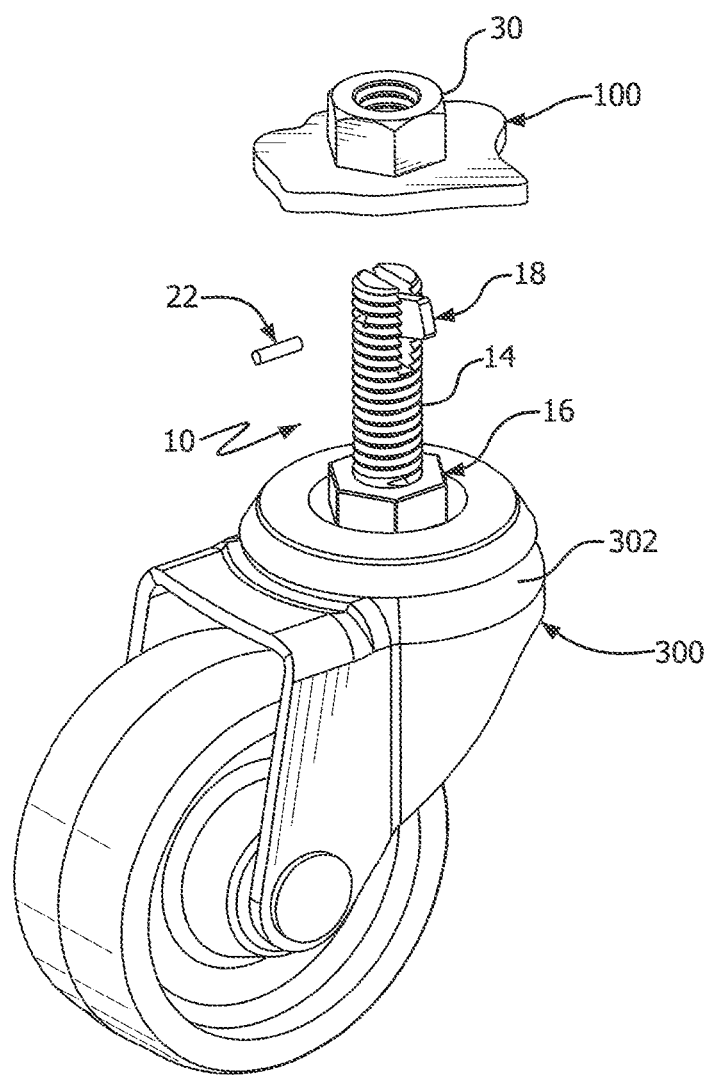
FIG. 18 shows the locking stem of FIGS. 1-14 depicted in use with a caster and attached fixture.

FIG. 18 shows the locking stem 10 of the present invention in use with a single-wheeled caster 300. The shank 14 of the locking stem 10 extends from a top surface of a yoke 302 of the caster 300.

Figure 19:
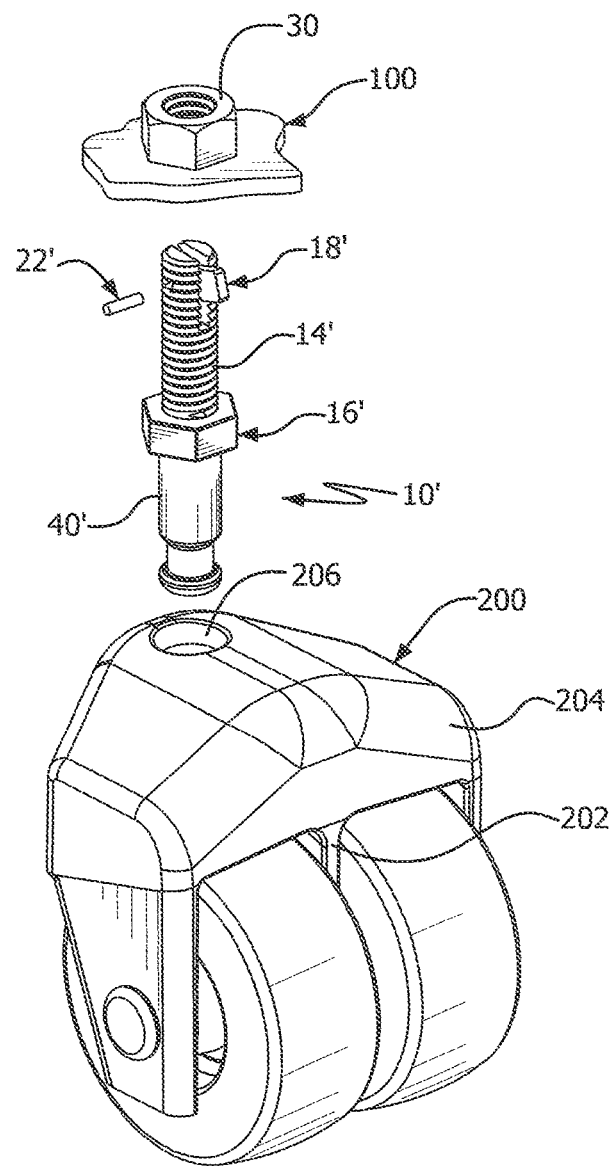
FIG. 19 show the locking stem of FIGS. 15-17 depicted in use with a caster and attached fixture.

FIG. 19 shows the locking stem 10' of the present invention in use with a dual-wheeled caster 200 having a weight bearing tab 202 formed in a yoke 204 of the caster housing. A bore 206 receives the press fit stem 40' of the locking stem 10'.

It should be understood that the present invention is suitable for use with any type of caster for use with any type of fixture. In addition, the locking stem can be used on any other suitable applications in which fasteners coming unattached is a problem.

Any reference in this specification to "one embodiment," "an embodiment," "example embodiment," and the like, means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A locking stem, comprising:
a bolt fastener having a pivoting tab that is disposed within a radial slot formed in one end of a shaft of the fastener, the pivoting tab pivots about a pivot, the tab has a pivot point located off center so the tab falls to one side when tilted, a bore is formed in the shaft transverse to the slot, a bore is formed in the tab, and a pivot pin passes through the slot bore and the tab bore to form the pivot point such that the tab pivots thereabout;
wherein the bolt fastener attaches to a complementary fastener attached to a fixture.

2. The locking stem according to claim 1, wherein the shaft is partially or fully threaded and the fixture fastener is also threaded to receive the fastener shaft.

3. The locking stem according to claim 2, wherein one end of the tab extends outwardly from one side of the shaft slot and an other end of tab extends outwardly from an other side of the shaft slot, such that an end wall of the tab engages a surface of the fixture fastener to prevent the stem from unthreading from the fixture.

4. The locking stem according to claim 1, wherein one end of the tab extends outwardly from one side of the shaft slot and an other end of tab extends outwardly from an other side of the shaft slot, such that an end wall of the tab engages a surface of the fixture fastener to prevent the stem from disengaging from the fixture.

5. The locking stem according to claim 1, wherein one end of the tab extends outwardly from one side of the shaft slot and an other end of tab extends outwardly from an other side of the shaft slot, such that an end wall of the tab engages a top surface of the fixture fastener and wherein the pivot pin and the top surface of the fixture fastener prevent the tab from rotating thereby the tab serves to prevent the stem from unthreading from the fixture.

6. The locking stem according to claim 1, wherein the shaft comprises a snap or press fit connector to attach the stem.

7. The locking stem according to claim 1, wherein the shaft is partially or fully threaded and the fixture fastener is also threaded to receive the fastener shaft, wherein the shaft comprises a snap or press fit connector to attach the stem, and wherein one end of the tab extends outwardly from one side of the shaft slot and an other end of tab extends outwardly from an other side of the shaft slot, such that an end wall of the tab engages a top surface of the fixture fastener and wherein the pivot pin and the top surface of the fixture fastener prevent the tab from rotating thereby the tab serves to prevent the stem from unthreading from the fixture.

8. A caster, comprising:
a yoke and at least one wheel rotatably mounted in the yoke; and
a bolt fastener attached to the yoke and having a pivoting tab that is disposed within a radial slot formed in one end of a shaft of the fastener, the pivoting tab pivots about a pivot, the tab has a pivot point located off center so the tab falls to one side when tilted, a bore is formed in the shaft transverse to slot, a bore is formed in the tab, and a pivot pin passes through the slot bore and the tab bore to form the pivot point such that the tab pivots thereabout;

wherein the bolt fastener attaches to a complementary fastener attached to a fixture.

9. The caster according to claim 8, wherein the shaft is partially or fully threaded and the fixture fastener is also threaded to receive the fastener shaft.

10. The caster according to claim 9, wherein one end of the tab extends outwardly from one side of the shaft slot and an other end of tab extends outwardly from an other side of the shaft slot, such that an end wall of the tab engages a surface of the fixture fastener to prevent the stem from unthreading from the fixture.

11. The caster according to claim 8, wherein one end of the tab extends outwardly from one side of the shaft slot and an other end of tab extends outwardly from an other side of the shaft slot, such that an end wall of the tab engages a top surface of the fixture fastener and wherein the pivot pin and the top surface of the fixture fastener prevent the tab from rotating thereby the tab serves to prevent the stem from unthreading from the fixture.

12. The caster according to claim 8, wherein the shaft comprises a snap or press fit connector to attach the stem.

13. A caster, comprising:
a yoke and at least one wheel rotatably mounted in the yoke; and
a bolt fastener attached to the yoke and having a pivoting tab that is disposed within a radial slot formed in one end of a shaft of the fastener, the pivoting tab pivots about a pivot, the tab has a pivot located off center so the tab falls to one side when tilted, wherein one end of the tab extends outwardly from one side of the shaft slot and an other end of tab extends outwardly from an other side of the shaft slot, such that an end wall of the tab engages a surface of the fixture fastener to prevent the stem from disengaging from the fixture.

* * * * *